United States Patent [19]
Florent

[11] Patent Number: 5,583,947
[45] Date of Patent: Dec. 10, 1996

[54] DEVICE FOR THE DETECTION OF OBJECTS IN A SEQUENCE OF IMAGES

[75] Inventor: Raoul Florent, Lillers, France

[73] Assignee: U.S. Philips Corporation, New York, N.Y.

[21] Appl. No.: 197,019

[22] Filed: Feb. 15, 1994

Related U.S. Application Data

[63] Continuation of Ser. No. 820,891, filed as PCT/NL91/00083, May 21, 1991, abandoned.

[30] Foreign Application Priority Data

May 18, 1990 [FR] France ..................... 9006254

[51] Int. Cl.[6] ..................... G06K 9/00
[52] U.S. Cl. ..................... 382/103; 382/263; 382/274; 348/169; 348/155
[58] Field of Search ..................... 382/1, 6, 48, 27, 382/54, 103, 263, 264, 274; 348/143, 144, 169, 155

[56] References Cited

U.S. PATENT DOCUMENTS

| | | | |
|---|---|---|---|
| 4,739,401 | 4/1988 | Sacks et al. | 382/1 |
| 4,827,533 | 5/1989 | Tanaka | 382/27 |
| 4,937,878 | 6/1990 | Lo et al. | 382/1 |
| 5,034,986 | 7/1991 | Karmann et al. | 382/1 |
| 5,083,200 | 1/1992 | Deffontaines | 340/942 |
| 5,109,435 | 4/1992 | Lo et al. | 382/48 |
| 5,111,511 | 5/1992 | Ishii et al. | 382/1 |
| 5,150,426 | 9/1992 | Banh et al. | 382/48 |
| 5,157,732 | 10/1992 | Ishii et al. | 358/105 |

*Primary Examiner*—Leo Boudreau
*Assistant Examiner*—D. Richard Anderson, Jr.
*Attorney, Agent, or Firm*—David Schreiber

[57] ABSTRACT

A device for the detection of objects in a sequence of images. The device having a means for registering images, means for increasing the contrast of objects within a registered image, means for increasing the contrast of moving objects between two registered images and means for a final selection of signals considered as corresponding to the objects to be detected.

15 Claims, 2 Drawing Sheets

DEVICE FOR THE DETECTION OF OBJECTS IN A SEQUENCE OF IMAGES

This is a continuation of application Ser. No. 07/820,891, filed as PCT/NL91/00083 May 21, 1991 now abandoned.

FIELD OF THE INVENTION

The present invention relates to a device for the detection of one or more objects in a sequence of images. Such a device can be used, in particular, in applications of the type concerned with traffic control or surveillance, for example, or again for the processing of images in the medical field.

BACKGROUND OF THE INVENTION

It is self-evident that the term "object" must in this case be considered in a broad sense, and that it covers not only inanimate objects but also persons or possibly animals, without any limitation of any type whatsoever with regard to the nature of these "objects". Moreover, it is necessary even at the present stage to state that the input data of the device according to the invention are digital images comprising a certain number of image points with which luminosity values are associated, and that it is therefore not necessary to give attention to the manner in which these images have been acquired, in this respect also there being no requirement for any limitation whatsoever.

It is not even necessary to make assumptions about the greater or lesser regularity of movements in the images (the only remaining assumption being that a continuous sequence of images, without change of viewing angle), since large displacements between two successive images can be taken into account as long as registration is possible.

SUMMARY OF THE INVENTION

The object of the invention is to provide a device for the detection of objects having a simplicity and a robustness which are sufficient to be adapted to a broad range of types of acquired images, it being possible for these objects to be, in the scenes observed, present in greater or lesser number, of greater or lesser mobility, or of greater or lesser contrast in relation to the background of the images, and of respective trajectories which possibly intersect one another.

To this end, the device according to the invention is characterised in that it comprises:

(A) means for the registration of images;
(B) means for increasing the contrast of objects within a registered image;
(C) means for increasing the contrast of the moving objects between two registered images;
(D) means for the final selection of the signals considered as corresponding to the objects to be detected.

In the structure thus proposed, said means for increasing the contrast of the objects within a registered image preferably comprise:

(a) a low-pass filter, provided for the purpose of determining p local averages of luminosity about a point of said registered image;
(b) a circuit for the computation, for p points referred to as neighbours surrounding a point of the unfiltered registered image, of the difference between the luminosity signal associated with this point of the unfiltered registered image and the luminosity signal associated, in the filtered registered image, with these p neighbouring points;
(c) a circuit for the selection of the lowest one, or one of the lowest of these differences;

said determination of averages, said difference computation and said selection being provided for each point of the unfiltered registered image, with the exception of the points situated at the border of the image.

Furthermore, in a preferred embodiment of the invention, the means for increasing the contrast of the moving objects comprise:

(a) a memory for the temporary storage of N images registered prior to the current registered image, N being a positive integer;
b) a circuit for the computation of the difference between the luminosity signal associated with each point of the current registered image and the luminosity signal associated with each point which spatially corresponds to it in the N-th prior registered image;
(c) circuit for the selection of one of the lowest of these differences.

In a modified embodiment of these means for increasing the contrast of the moving objects, the difference computation circuit is provided for the purpose of forming the difference between the luminosity signal associated with each point of the current registered image and the luminosity signal associated, in the N-th prior registered image, with the point spatially corresponding to said point of the current image and to the p points which surround this corresponding point.

Moreover, the final selection means preferably comprise:

(a) a circuit for the multiplication of two quantities linked to the respective output signals of said means for increasing the contrast of the objects within the registered image and of said means for increasing the contrast of the moving objects;
(b) a threshold decision circuit; it being possible for said two quantities to be, in particular, the respective output signals themselves.

In these final selection means, the threshold of the decision circuit is, for example, either predetermined as a function of the desired maximum number of alarms or chosen in such a manner as to optimise a criterion linking the probability of false alarm and the detection level, such as, in particular, the ratio of the number of objects detected to the number of false alarms.

The device thus proposed may be further improved by providing a circuit for the replacement of the negative differences by the value zero, either at the output of the means for increasing the contrast or at the head of one or the other of the various embodiments of the final selection means.

Finally, by appropriately choosing the circuits carrying out the various elemental operations provided in the device, the various registration, contrast increasing and final selection means which make up the device may be in a very advantageous manner organised to operate in real time.

BRIEF DESCRIPTION OF THE DRAWINGS

The particular features and advantages of the invention will emerge more specifically in the description which follows and in the accompanying drawings, which are given by way of non-limiting examples and in which:

FIGS. 3b and 4b show modified embodiments of the means represented in FIGS. 3a and 4a.

DESCRIPTION OF EMBODIMENTS

Figure 1:
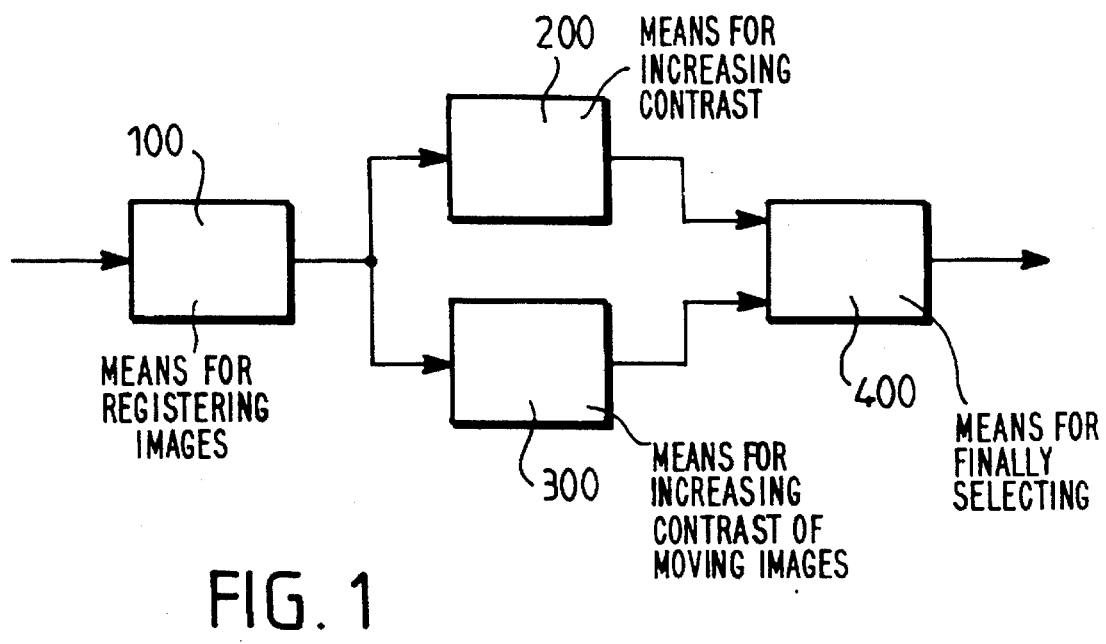
FIG. 1 shows an illustrative embodiment of a device for the detection of objects according to the invention.

The device for the detection of objects which is represented in FIG. 1 comprises first of all means for the registration of images 100. It will be recalled at this point that the registration of images is an operation which is known per se, and described, for example, in the work "Digital image processing", by W. K. Pratt, J. Wiley and Sons, 1978. Its principle is the following. Considering, in a sequence of images, a first reference image and a second image which is subsequent to it, there are chosen within the reference image a few zones of interest, which are referred to as reference zones, which are centered on what will be called reference points, and a search is made in the second image, as a function of a determined criterion, for the zones which show best agreement with these reference zones and which are referred to then as agreement zones centered on what are called agreement points. These reference points and these agreements points are then associated in such a manner that a set of displacement vectors is available, the entirety of which constitutes a representative map of a global parametric transformation relating these two images, where the parameters of this transformation are, for example the coordinates of a translation vector, a rotation angle, and the coordinates of the centre of rotation, or the coordinates of a zooming centre and a zooming scale factor. The only matter remaining is that of constructing the compensated version— referred to as the registered image—of the second image, by applying the inverse transformation to all the image points of this second image, and by performing the required interpolations.

Figure 2:
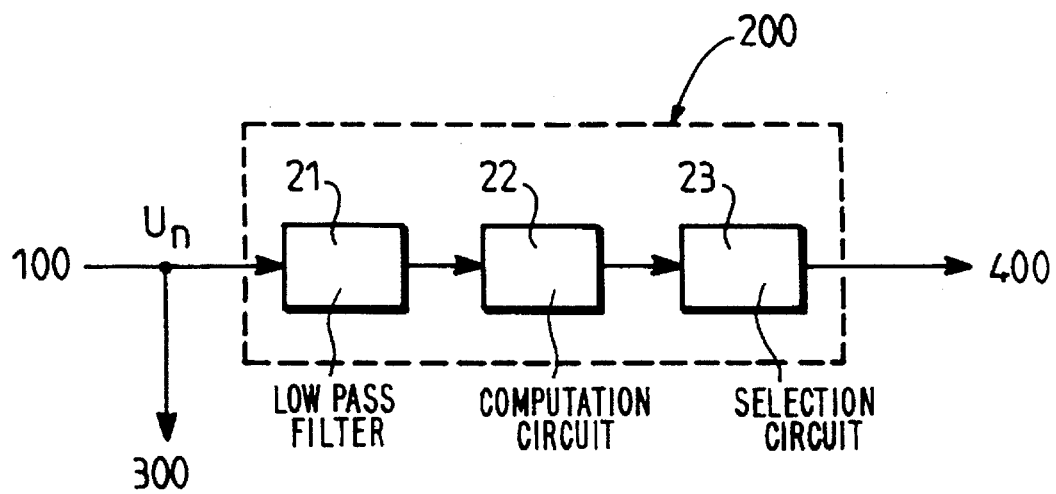
FIGS. 2, 3a and 4a show an illustrative embodiment respectively of the means for increasing the contrast of the objects within a registered image, of the means for increasing the contrast of the moving objects and of the final selection means.

The means for the registration of images 100 are followed, as indicated in FIG. 1, by means 200 for increasing the contrast of the objects within a registered image. In the particular embodiment shown in FIG. 2, these means 200 comprise first of all a low-pass filter 21, which receives the output signals of the means for the registration of images 100, that is to say the current registered image, denoted for example $U_N$. This current image $U_N$ is constituted by a certain number of registered image points with which there are associated luminosity values expressed in bits over a determined dynamic range. The function of the low-pass filter 21 is to determine p local averages of luminosity (with, in this case, p=8) about a point of said registered image, the spatial extent of these spatial averages being linked to the size of the objects that have to be detected. This filtering operation is, of course, generalised to the entirety of the registered image, (except for the points of the image which are situated at the border of the latter: detection of objects at the border is not attempted). No further description of such a filter will be given, an example thereof being, in fact, given in the article "Target acquisition and extraction from cluttered backgrounds" by S. A. Dudeni, SPIE, vol. 302, Infrared Technology for Target Detection and Classification, 1981, pp. 43–50, which gives full details concerning the specification of such a contrast filter.

The low-pass filter 21 is followed by a computation circuit 22 which, for the p points which are neighbours of said point of the registered image-and correspond to said determined local averages, evaluates the difference between the luminosity signals associated in the filtered registered image with each one of said p points. Of course, this operation of computation of differences is, just like the preceding filtering, generalised to the entirety of the registered image, except for the points situated at the border of the image, and the same applies to the following operation. In fact, a selection circuit 23 finally compares these p differences two by two, and selects the lowest one from among them, or possibly, the circuit 23 even comprises a ranked value filter or which selects one of the lowest differences, which offers more robustness against the apparition of a high intensity object in the region of one of the local averages. The difference thus selected constitutes the output signal of the means for increasing the contrast 200 in the particular example described here.

Figure 3A:
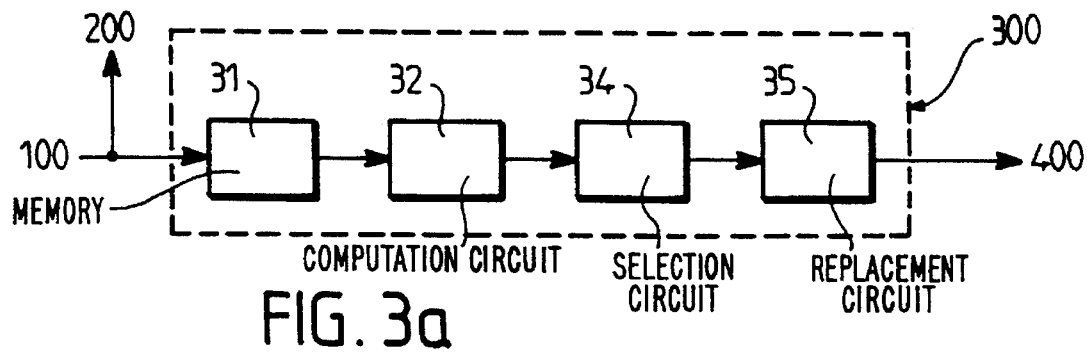

As shown in FIG. 1, the means for the registration of images 100 are also followed by means 300 for increasing the contrast of the moving objects between two registered images. In the particular embodiment shown in FIG. 3a, these means 300 comprise first of all a memory 31 for the temporary storage of N images registered images prior to the current registered image (N being a positive integer: 1, 2, ... etc.). A computation circuit 32 then forms the differences between the luminosity signal associated with each point of the current registered image and the luminosity signal associated with each point which spatially corresponds to it in the N-th prior registered image, and then the choice of the lowest of these differences is made by a selection circuit 34. The output of this circuit 34 constitutes that of the means 300 for increasing the contrast, in the example described.

Figure 3B:
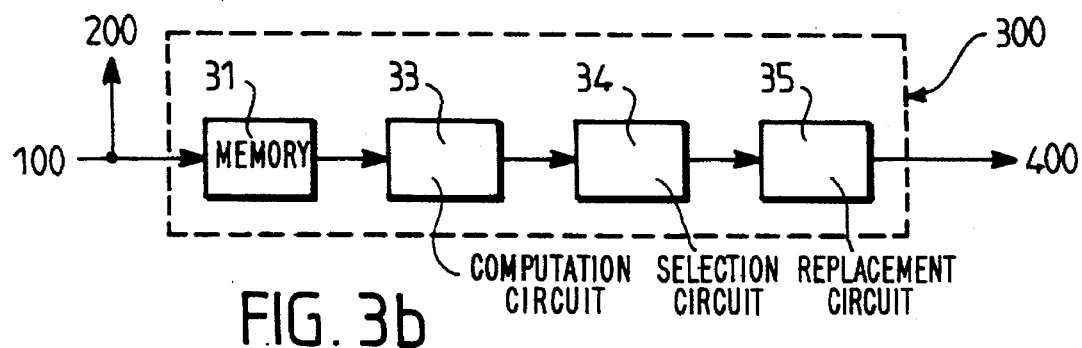

In another illustrative embodiment of these means 300 for increasing the contrast, which are shown in FIG. 3b, the computation circuit 32 is replaced by a computation circuit 33, this time forming the differences between the luminosity signal associated with each point of the current registered image and the luminosity signal associated, in the N-th prior registered image, with the point spatially corresponding to said point of the current image and to the p points which surround this corresponding point. The value of N is chosen depending on the speed of the object that must be detected, as the lowest detectable speed is in this way 2 pixels during N images. In this case also, the difference computation thus performed is generalised to the entirety of the points of the current registered image, except for those situated at the border of the image, just like the selection operation which follows this computation.

As has been described above, the selection circuit 23 may comprise a ranked value filter which eliminates one or more of the lowest differences thus computed and selects, after this elimination, the lowest one of the residual differences. It will likewise be stated at this point that the contrast increasing means, may comprise, one or the other or both simultaneously, a circuit 35 for the replacement of the negative differences by the value zero, which circuit is placed, for example, at the output of the selection circuit 34 (accordingly, in the present case, this circuit 35 has been shown only, for example, at the output of the means 300, in FIG. 3a and 3b).

For objects which are brighter than the background, the presence of such a replacement circuit in association with the means 200 is intended to permit no account to be taken of the points of negative local contrast, corresponding, in fact, to objects which have a decreasing point nature. The presence of such a circuit in association with the means 300 is intended to permit no account to be taken of the object-background transitions, corresponding to disclosure zones.

Figure 4A:
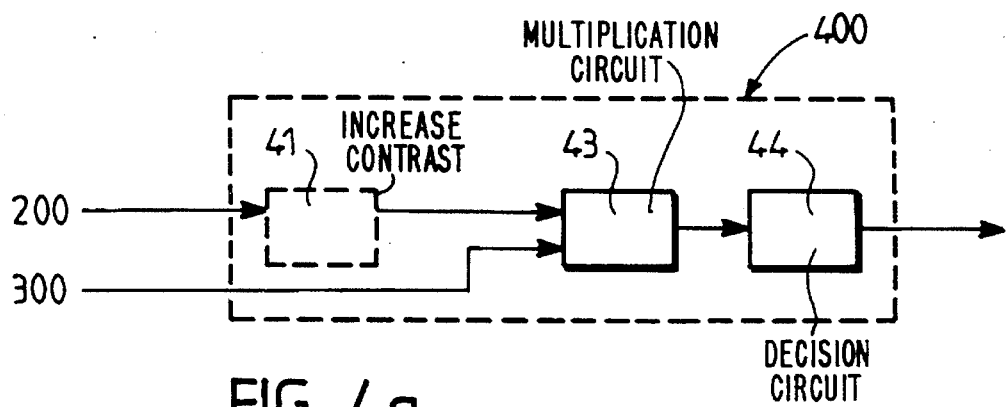

At the output of the means 200 for increasing the contrast of the objects within a registered image and of the means 300 for increasing the contrast of the moving objects there are then provided means 400 referred to as means for the final selection of the signals which will be considered as corresponding to the objects to be detected. In the particular embodiment shown in FIG. 4a, these means 400 comprise first of all a circuit 43 for the multiplication of two quantities f and g, the first of which is linked (for example through a weighting compromise) to the output signal of the means for increasing the contrast 200 and the second to the output signal of the means for increasing the contrast 300.

Advantageously, these two quantities may be quite simply said respective output signals of these means 200 and 300, but this is only a non-limiting example. By using, for example, the following notations:

x=output signal of the means 200;

y=output signal of the means 300;

k=contrast (or difference of luminosity) between the grey tone corresponding to an object and the average value of the grey tone for the background zone which surrounds this object;

s=standard deviation of the noise in the image;

n=the number of points of the filtering mask used in the means 200;

m=the number of neighbouring image points considered in the means 200;

the quantities f and g may then be those indicated by the formulae (1) and (2) in the annex to the present description. The expressions N(.) and erf(.) appearing in these formulae are themselves indicated with the aid of the formulae (3) and (4) which likewise appear in the annex, by replacing a and b in a manner which is evident by the corresponding values observed in the formulae (1) and (2). This second approach, which makes reference to a utilisation of the criterion referred to as the probability maximum criterion, is valid subject to the application of simplifying assumptions (uniform background, in which each image point is associated with an independent additive gaussien noise, of average zero and of the same variance).

At the output of the multiplication circuit 43, a threshold decision circuit 44 permits the final extraction of the signals considered as effectively corresponding to the objects to be detected. The choice of the threshold is related to the type of object, that is, to the statistical nature of the image at the output of the means 400, and is usually determined as a function of the histogram of the image. In another embodiment, the decision circuit 44 operates with a threshold which is simply predetermined as a function of the desired maximum number of alarms, or possibly this threshold is chosen in such a manner as to optimise a criterion linking the probability of false alarm and the detection level, for example the ratio of the number of objects detected to the number of false alarms.

Figure 4B:
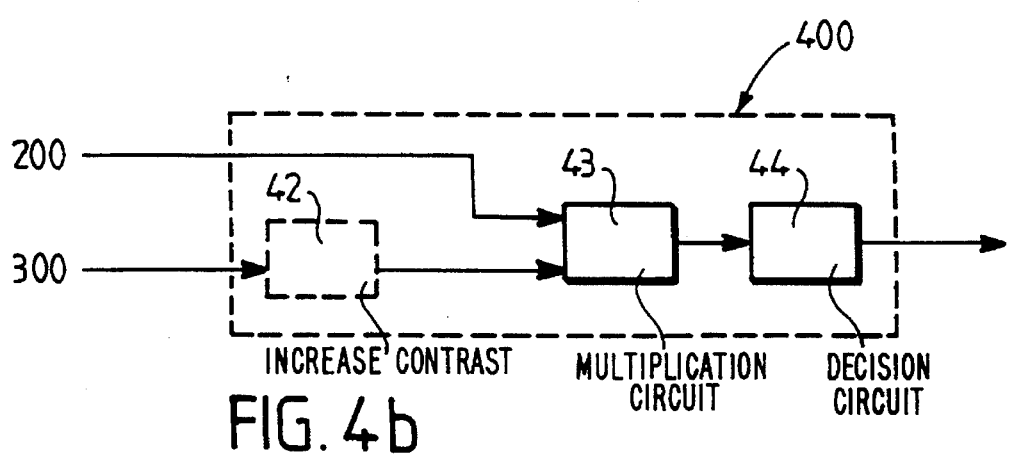

Of course, the present invention is not limited to the illustrative embodiments which have just been described, on the basis of which other variants may be proposed, while still remaining within the scope of the invention. In particular, mention has been made of the presence, at the output of the means for increasing the contrast 200 or 300, of a circuit 35 for the replacement of the negative differences by the value zero. It is possible to include a circuit of this type not within these means 200 or 300, but within the final selection means 400, as indicated in broken lines in FIG. 4a, which shows a circuit 41, placed between the output of the means for increasing the contrast 200 and the corresponding input of the multiplication circuit 43, or indeed in FIG. 4b, which shows the location of a similar circuit 42 placed between the output of the means for increasing the contrast 300 and the other input of the multiplication circuit 43.

It will likewise be stated that it is extremely beneficial for the described device to be capable of operating in real time. The various elemental operations (linear or morphological filtering, difference, product, encoding tables for the establishment of the functions f and g, etc, . . . ) are then performed by means of electronic image processing cards which are commercially available, such as the cards under the registered trademark "Datacube" of the company Datacube Inc., 4 Dearborn Road, Peabody, Mass. 01960, USA. Such a construction permits an operation of the device in real time, at video rate.

ANNEX

Formula (1):

$$f(x) = \frac{N_{k,s/n}(x)}{N_{o,s(1+\frac{1}{\sqrt{n}})}(x)} \cdot \frac{\frac{1}{2} - \text{erf}\frac{x-k}{s/\sqrt{n}}^{m-1}}{\frac{1}{2} - \text{erf}\frac{x}{s(1+1/\sqrt{n})}^{m-1}}$$

Formula (2):

$$g(y) = \frac{N_{k,s}(y)}{N_{o,s\sqrt{2}}(y)}$$

Formula (3):

$$N_{a,b}(x) = \frac{1}{\Pi b\sqrt{2}} e^{-(x-a)^2/2b^2}$$

Formula (4):

$$\text{erf}(x) = \frac{1}{\Pi\sqrt{2}} \int_o^x e^{-\frac{1}{2}y^2} dy$$

I claim:

1. A device for detection of one or more objects in a sequence of images, said sequences of images including objects of varying magnitude, comprising:

(a) means for forming a current registered image and a prior registered image from the sequence of images;

(b) means for increasing an absolute contrast of smaller objects with respect to an absolute contrast of larger objects within the current registered image and for producing a first output, (c) means, operating in parallel with said means for increasing an absolute contrast, for increasing a contrast of moving objects between said current and said prior registered images producing a second output; and (d) means for receiving said first output of said means for increasing an absolute contrast and said second output of said means for increasing a contrast of moving objects between said current and said prior registered images for making a final selection of signals considered as corresponding to the objects to be detected.

2. The device according to claim 1, wherein said means for increasing an absolute contrast comprises:

(a) a low pass filter for determining p local averages of luminosity about a point of the current registered image to thereby generate a filtered registered image;

(b) a first circuit for computing differences between a luminosity signal associated with each point of said current registered image and a luminosity signal associated with p neighboring points in the filtered registered image, the p neighboring points surrounding the point of said current registered image; and (c) a second circuit for selecting one of a lowest one of differences computed in the first circuit, wherein the determining of averages, the computing of differences and the selecting of one of the lowest differences is provided for each point of said current registered image, with the exception of points situated at a border of the image.

3. The device according to claim 2, wherein said selection circuit is a filter of rank specified to eliminate one of the lowest differences computed and to select the lowest one of residual differences after this elimination.

4. The device according to claim 1, wherein said means for increasing the contrast of the moving objects comprises:

(a) a memory for storing N images registered prior to said current registered image, N being a positive integer;

(b) a circuit for computing a difference between a luminosity signal associated with each point of the current registered image and a luminosity signal associated with each point which spatially corresponds to it in the N-th prior registered image; and (c) a circuit for selecting a lowest of the differences.

5. The device according to claim 1, wherein said means for increasing the contrast of the moving objects comprises:

(a) a memory for storing N images registered prior to said current registered image, N being a positive integer;

(b) a circuit for computing a difference between a luminosity signal associated with each point of the current registered image and a luminosity signal associated, in the N-th prior registered image, with points which spatially correspond to said point of said current registered image and to points which surround the corresponding points; and (c) a circuit for selecting a lowest of the differences.

6. The device according to claim 3, wherein said means for increasing an absolute contrast comprises a circuit for replacing differences having a negative polarity by a value zero.

7. The device according to claim 2, wherein said means for increasing the contrast of the moving objects comprises a circuit for replacing differences having a negative polarity by a value zero.

8. The device according to claim 6, wherein said means for making the final selection comprises:

(a) a circuit for multiplying said first output of said means for increasing an absolute contrast and said second output of said means for increasing the contrast of the moving objects; and (b) a threshold decision circuit.

9. The device according to claim 3, wherein the means for making the final selection comprises:

(a) a circuit for replacing a value of said first output of the means for increasing an absolute contrast having a negative polarity by a value zero, said circuit for replacing producing a third output;

(b) a circuit for multiplying said third output of said circuit for replacing and said second output of the means for increasing the contrast of the moving objects; and (c) a threshold decision circuit.

10. The device according to claim 3, wherein said means for making the final selection comprises:

(a) a circuit for replacing said second output of the circuit for increasing the contrast of the moving objects by a value zero;

(b) a circuit for multiplying said first output of the means for increasing an absolute contrast and said third output of said replacement circuit; and (c) a threshold decision circuit.

11. The device according to claim 8, wherein said quantities are respective output signals.

12. The device according to claim 8, wherein the threshold of said decision circuit is predetermined as a function of a desired maximum number of alarms.

13. The device according to claim 8, wherein the threshold of said decision circuit is chosen in such a manner as to optimize a criterion linking a probability of false alarm and a detection level.

14. The device according to claim 13, wherein said criterion to be optimized is a ratio of number of objects detected to number of false alarms.

15. The device according to claim 1, wherein said registration, contrast increasing and final selection means operate in real time.

* * * * *